Oct. 11, 1960    E. O. KOLLMORGEN ET AL    2,955,512
TELESCOPE RIFLE SIGHT WITH PIVOTED
RETICLE AND ERECTOR LENS TUBE
Filed April 3, 1956                           2 Sheets-Sheet 1
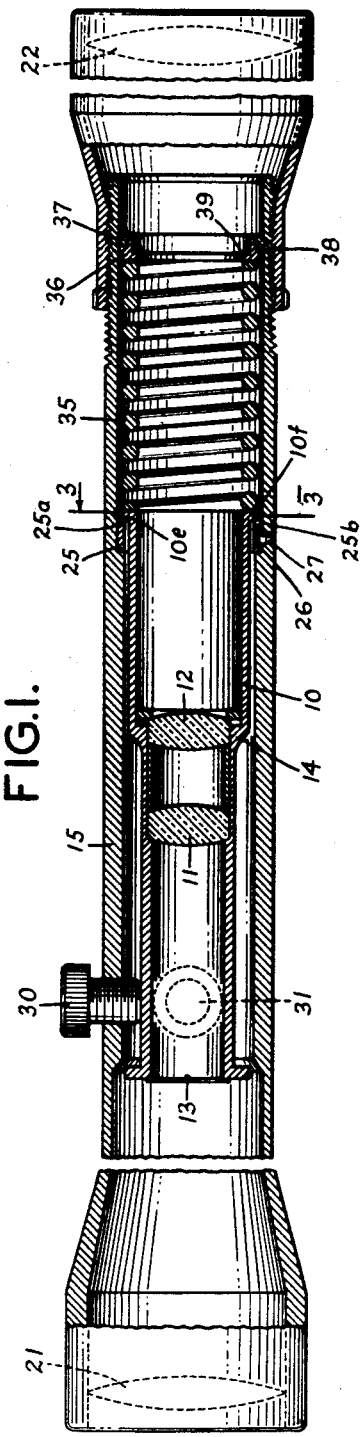
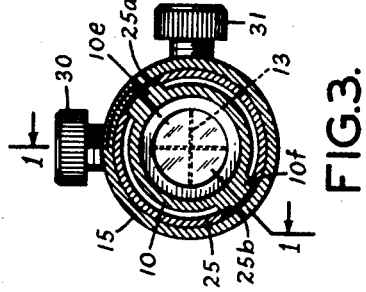
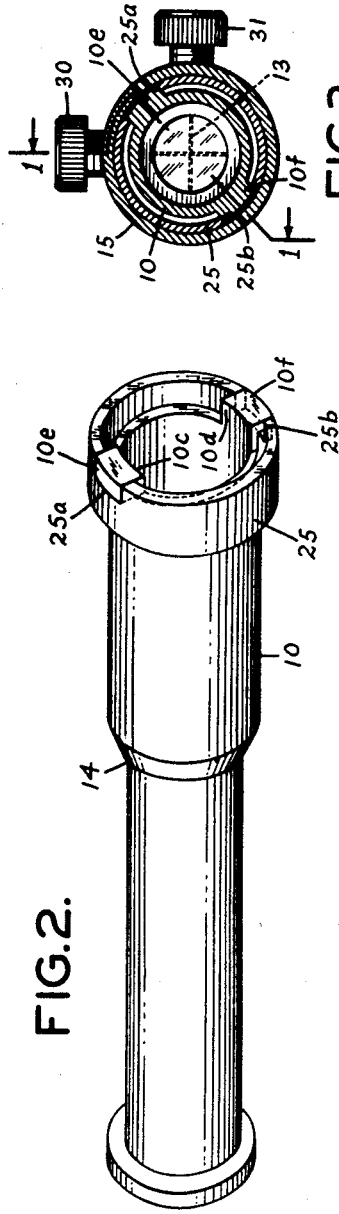
INVENTORS
ERNST O. KOLLMORGEN
JOHN L. RAWLINGS
BY
THEIR ATTORNEYS

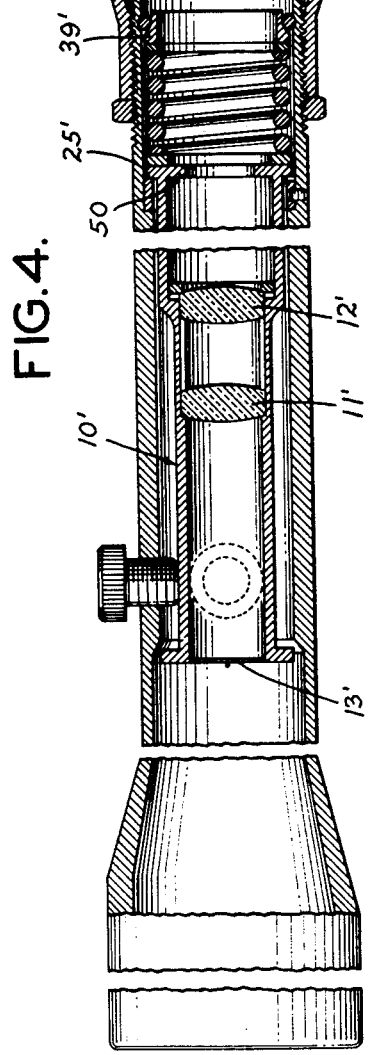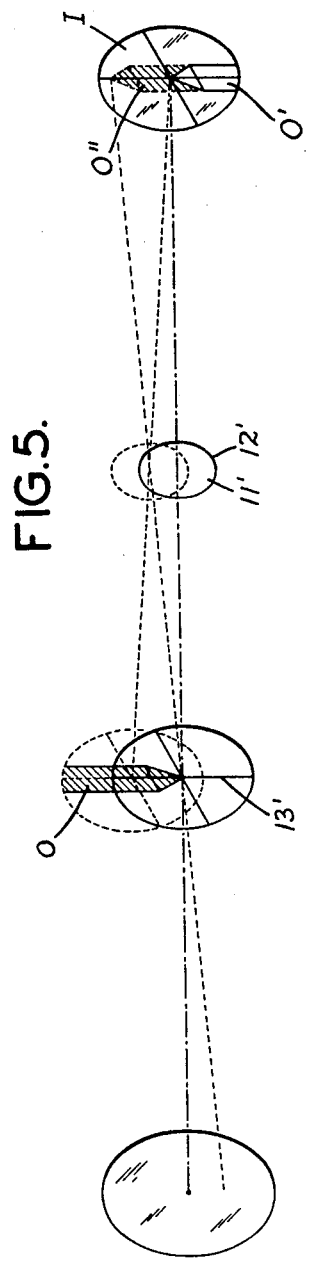

United States Patent Office 2,955,512
Patented Oct. 11, 1960

2,955,512

TELESCOPE RIFLE SIGHT WITH PIVOTED RETICLE AND ERECTOR LENS TUBE

Ernst O. Kollmorgen and John L. Rawlings, Amherst, Mass., assignors, by mesne assignments, to Redfield Gun Sight Co., Denver, Colo., a Colorado limited partnership Filed Apr. 3, 1956, Ser. No. 575,850

3 Claims. (Cl. 88—32)

This invention relates to improvements in optical sighting instruments, and more particularly, to reticle movements for use in optical instruments, such as telescopic rifle sights.

This is a continuation-in-part of our application Serial No. 481,090, filed January 11, 1955, now abandoned.

The reticle commonly used in rifle sights must be precisely positioned and capable of accurate adjustment to correct for range or elevation and windage. Furthermore, inasmuch as telescopic sights for rifles are subjected to considerable shock during firing, the adjusting mechanism therefor must be rugged to prevent it from being jarred out of its adjusted position.

Because of the precision nature of the reticle movement and the need for a sturdy supporting and adjusting mechanism, such movements heretofore have been rather complicated and relatively expensive. For example, conventional reticle movements frequently include guide rods, frames or springs enabling the reticle to be adjusted to correct for range or windage or both. If only one reticle adjustment is provided, the guides and adjusting screws can be reduced in number and complexity, but nevertheless, the parts must be machined within very close tolerances in order to prevent undesirable play of the reticle within its supporting frame.

The present invention relates to improvements in reticle movements for telescopic sights wherein the reticle can be adjusted accurately for range and/or windage without noticeably moving the reticle relative to the center of the field of view of the sight. The movement includes a reticle mount that is supported by means which permits limited angular motion of the reticle mount around a center in or close to the eye piece image plane so that the reticle and erecting lenses covered by the mount are displaced substantially in ratio to the movement of the mount. The mount is constructed to prevent rotation of the reticle about the optical axis of the telescope and linear motion along such axis and is spring-urged into engagement with the means for adjusting the reticle for range and/or windage.

The connection between the reticle mount and the housing comprises at least two projecting ears accommodated within cooperating guides or slots which permit angular movement of the mount around one of the ears as a pivot. The other ear is movable in a deeper guide or slot than the other and can move angularly while the other engages the bottom of its cooperating slot or guide as a pivot. The movement includes a spring which bears against the reticle mount and normally biases it in a direction tending to move the ears into engagement with the bottoms of their corresponding slots.

Preferably, the ears are carried by the mount and the guides or slots are formed in the housing or in a member attached thereto, although the projections may be associated within the housing and the guides therefor carried by the mount. Also, it is desirable that the projections or guides of the mount are diametrically opposite and project outwardly beyond the sides of the mount for engagement in their guides. The spring pressure which, preferably is applied against the end of the mount will cause such pivotal movement of the mount as the adjusting means allows.

For a more complete understanding of these and other features of the present invention, reference may be had to the description which follows and to the accompanying drawings in which:

Fig. 1 is a longitudinal cross-section view of an optical sight instrument embodying the present invention taken substantially along the line 1—1 of Fig. 3, looking in the direction of the arrows;

Fig. 2 is a perspective view of the reticle mount and the support means therefor;

Fig. 3 is a transverse cross-section view taken on the line 3—3 of Fig. 1, looking in the direction of the arrows.

Fig. 4 is a view in longitudinal section through a modified form of telescopic sight, and Fig. 5 is a schematic illustration of the action of the reticle movement in maintaining the reticle centered with respect to the visual field through the sight.

The reticle movements of the type embodying the present invention may be used with many different types of optical instruments, and the specific application of the present invention to a telescopic sight for a rifle, as described herein, is for purposes of illustration only.

Referring to Fig. 1, the reticle mount of the telescopic sight may include a tubular support or barrel 10 containing the erecting lenses 11 and 12 therein and having the reticle or cross hair 13 mounted at one end of the barrel. Although the barrel 10 is generally cylindrical in form, it tapers at a neck portion 14 which divides the mount into sections of larger and smaller diameter.

The barrel 10 is disposed within the tube or housing 15, of the telescope. The telescope may be mounted on a rifle with any of the usual types of mounts.

One end of the tube 15 carries an eye piece 20 and the opposite end carries the objective, and the line of sight of the instrument is along an optical axis which passes through the objective lens 21 and the eye piece lens 22 and through the barrel 10 containing the reticle.

The larger end of the barrel 10 is provided wtih a pair of outwardly projecting ears or flanges 10e and 10f formed integrally with the barrel and connected to the end thereof by linearly disposed, elongated portions 10c and 10d, respectively. The ears 10e and 10f project in diametrically opposite directions, so that their centers are approximately 180° apart, and the ears 10e, 10f are adapted to be aligned with and to engage guide slots 25a and 25b formed in a circular sleeve 25. The sleeve 25 encircles the larger end of the barrel 10, and it is positioned within the housing 15 by one or more screws 27 or dowels in such fashion that one edge of the sleeve engages a shoulder 26 formed in the inner periphery of the housing. The screws 27 thus restrain the sleeve from rotation within the housing, and inasmuch as the ears 10e and 10f engage the slots 25a, 25b of the sleeve, the barrel 10 is also prevented from rotation about its axis within the housing.

The slot 25b which accommodates the ear 10f is somewhat deeper than the slot 25a so that when the barrel 10 is urged forwardly and the ear 10e engages the forward end of its slot 25a, pivotal movement of the barrel 10 is permitted to enable the axis of the barrel to be angularly shifted within the housing, the limit of said angular movement being determined by the engagement of the ear 10f with the end of the deeper slot 25b. Rocking movement of the barrel 10 is not restricted to one plane because the ear 10e can also roll or rock along the curved outer edge of the bottom of the slot 25a. Thus, in effect the engagement of the ear 10e with the bottom of the slot 25a serves as a pivot for the barrel 10 allowing limited rocking movement in substantially all directions.

The position of the reticle in the smaller end of the barrel 10 is determined by the engagement of the barrel with two adjustable screws 30 and 31 disposed at right angles to each other. The vertical screw 30 is used to adjust the reticle for elevation or range, and the horizontally disposed screw 31 is used to adjust for windage. The barrel-engaging ends of the screws 30 and 31 are preferably flat in order that an adjustment of the barrel 10 by means of one screw enables the barrel to move across the flat end of the other screw without affecting the setting of the other screw. If desired, the end of the barrel engaged by the adjusting screws may be formed to present a square or rectangular cross section so that the ends of both screws will be in contact with flat surfaces to insure that the adjustment of the reticle by means of one screw will not necessitate an adjustment of the other screw.

While simple screws 30 and 31 are shown as means for adjusting the reticle mount it will be appreciated that the slotted "hunter" type of adjusting screws or covered calibrated screws can be used, if desired.

A compression spring 35 is accommodated within the tube 15 and bears at one end against the ears 10e and 10f, which protrude beyond the open ends of the slots 25a and 25b. A removable ring 36 engages the outer end of the spring 35 and is held in position compressing the spring by means of a snap ring 37. The ring 36 has a tapered or beveled outer surface 38 which wedges the snap ring 37 in the gap formed between the beveled surface 38 and the inner periphery of the barrel 15, the wedge action maintaining the removable ring 36 in fixed position. The ring 36 serves as a lock ring for the spring and also has an inner flange 39 forming an eye piece diaphragm.

With the construction described, the pressure of the spring 35 will urge the barrel 10 toward the left as viewed in Fig. 1, and the projections 10e, 10f will be urged toward the bottoms of the respective guide slots 25a, 25b. The slot 10e being of shorter length will engage the end of the slot 25a, but the deeper slot 25b will permit the barrel to be pivoted so that its ultimate position is determined by the contact of the opposite end of the barrel with the adjusting screws 30, 31. To facilitate this adjustment, when viewed endwise, as in Fig. 3, the shorter slot 25a and the ear 10e accommodated therein should be in the quadrant formed by the screws 30, 31. If, however, adjustment were provided only for elevation or range, the slot 25a and the ear 10e would preferably be aligned with the adjusting means therefor. For example, if the screw 30 for adjusting range were disposed at the twelve o'clock position, as it is shown in the drawing, the slot 25a would be located so that it would be at the twelve o'clock position, whereas if the screw 30 were at the six o'clock position, the slot 25a would be located at the six o'clock position.

It should be noted that in the structure for supporting the reticle mount, no fastenings are employed in the entire assembly, other than the snap ring 37 and the screw 27 used to prevent the rotation of the sleeve 25, thus facilitating assembly and disassembly. Another advantage of the construction lies in the fact that the erector lenses 11 and 12 can be mounted in the tube 10 and, for that reason, move in ratio to the displacement of the reticle and thus enable the scope to be adjusted with little or no apparent displacement of the reticle from the center of the field of view as defined by eye piece diaphragm 39. For example, it permits relatively wide adjustment of the sight relative to the rifle, as, for example, when "zeroing in" the sight when it is mounted somewhat out of alignment with the barrel of the rifle, without causing marked displacement of the center of the reticle from the center of the field of view. Apparent displacement of the reticle with respect to the center of field of view can be avoided completely by positioning the center of movement of the barrel on which the erecting lenses and the reticle are mounted in the eye piece image plane and also locating the diaphragm of the sight in the eye piece image plane. A sight having this preferred relation of elements is shown in Fig. 4 and also is illustrated schematically in Fig. 5.

As illustrated in Figure 4, the modified form of sight is similar to the telescopic sight shown in Figures 1 to 3 insofar as its components are concerned. The principal difference is that the retaining ring 39' of the new sight is shortened to move the bottom of the notch 25a' into the eye piece image plane so that the center of movement of the tube 10' and the reticle 13' and the erecting lenses 11' and 12' mounted in the tube is in the eye piece image plane. Moreover, the diaphragm 50 of the new sight is also located at the right-hand end of the tube 10' and thus is also essentially in the eye piece image plane. The effect of this arrangement of elements is shown graphically in Figure 5, in which the image O of a real object is formed by the objective lens 21' on a plane coinciding with that of the reticle 13'. Assuming that the center of movement of the reticle 13' and the erecting lenses 11' and 12', shown schematically as one lens, is in the eyepiece image plane, the image O is represented by its conjugate image O' in the image plane, both images in the eye piece focal plane being centered on the optical axis extending between the center of the eye piece diaphragm and the center of the objective lens 21'. This diaphragm limits the field of view to only a portion of the total field which would otherwise be visible through the sight. When the tube 10' is adjusted to the dotted line position shown in Figure 5, the movement of the reticle 13' and the erecting lenses 11' and 12' are in ratio, and result in no change in the position of the reticle image in the eye piece focal plane. However, since no movement of the image O accompanies the movement of the reticle 13' under these circumstances, it is obvious that the rotation of the reticle tube as aforesaid will result in a displacement of the conjugate image of O in the eye piece focal plane, and shown by the crosshatched image O''. In the adjusted position, no change in relation of the reticle and the erecting lenses with respect to the field of view at the image plane has taken place and the reticle remains in the center of the field of view defined by the diaphragm. Inasmuch as a different portion of the object is visible through the sight and the reticle remains centered, the effect is similar to that produced by moving the entire telescopic sight. The new sight obtains this effect by means of internal adjusting mechanism which is protected against the elements and which enable the sight to be mounted in more solid, fool-proof, and jar-resisting mounts on the rifle.

The invention has been shown by way of example only and many modifications and variations may be made therein without departing from the spirit of the invention. It is to be understood, therefore, that the invention is not to be limited to any specified form or embodiment except insofar as such limitations are set forth in the claims.

We claim:

1. A reticle mount for telescopic devices comprising a barrel, optical elements therein providing an eye piece image plane within said barrel, an elongated member in said barrel, means on said barrel and said member supporting said member for pivoting movement transversely of said barrel, said means being adjacent to one end of said member and essentially in said image plane, adjusting means for moving said member pivotally, a reticle and a lens for inverting the sighted image mounted in spaced relation lengthwise of said elongated member, said lens being positioned between said reticle and said eye piece image plane and focusing an image of the reticle essentially in said image plane whereby any movement of the reticle is accompanied by a related movement of the lens in the same direction to maintain the image of said reticle substantially centered in said eye piece image plane.

2. A reticle mount for telescopic devices comprising a barrel, optical elements therein providing an eye piece image plane within said barrel, a tubular member in said barrel, means in said barrel pivotally supporting one end of said tubular member for movement of its other end transversely of said barrel, said means being located essentially in said eye piece image plane, adjusting means engaging the tubular member for moving it transversely, a reticle and an erecting lens mounted in spaced axial alignment in said tubular member, said lens being positioned between said reticle and said eye piece image plane and focusing an image of said reticle at said image plane.

3. A reticle mount as set forth in claim 2 wherein said means includes at least two separate guides, and guided means accommodated within each of the guides and permitted relative movement therewith, one of the guided means being permitted greater relative movement than the other.

References Cited in the file of this patent

UNITED STATES PATENTS

| | | |
|---|---|---|
| 239,315 | Chandler | Mar. 29, 1881 |
| 1,006,699 | Straubel | Oct. 24, 1911 |
| 2,496,045 | Ford | Jan. 31, 1950 |
| 2,578,130 | Ford | Dec. 11, 1951 |
| 2,580,280 | Bullard | Dec. 25, 1951 |
| 2,627,659 | Murr | Feb. 10, 1953 |

FOREIGN PATENTS

| | | |
|---|---|---|
| 704,350 | Great Britain | Feb. 17, 1954 |